US007759648B2

(12) United States Patent
Mintzer et al.

(10) Patent No.: US 7,759,648 B2
(45) Date of Patent: Jul. 20, 2010

(54) MAGNETICALLY RETAINED INTERCHANGEABLE COLLIMATORS FOR SCINTILLATION CAMERAS

(75) Inventors: Robert A. Mintzer, Knoxville, TN (US); Stefan B. Siegel, Knoxville, TN (US); Derek W. Austin, Knoxville, TN (US); Casey Barrett Holbrook, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 12/209,411

(22) Filed: Sep. 12, 2008

(65) Prior Publication Data

US 2009/0072149 A1 Mar. 19, 2009

Related U.S. Application Data

(60) Provisional application No. 60/973,075, filed on Sep. 17, 2007.

(51) Int. Cl.
*G21K 1/02* (2006.01)
*G01T 1/161* (2006.01)

(52) U.S. Cl. ............................... 250/363.1; 250/363.08

(58) Field of Classification Search ............ 250/363.01, 250/363.05, 363.06, 363.08, 363.1, 370.08, 250/370.09, 363.02, 363.04
See application file for complete search history.

(56) References Cited

U.S. PATENT DOCUMENTS

| | | | | |
|---|---|---|---|---|
| 4,597,096 | A * | 6/1986 | Larsson | 378/149 |
| 6,693,291 | B2 * | 2/2004 | Nelson et al. | 250/505.1 |
| 6,946,659 | B2 * | 9/2005 | Ito et al. | 250/363.06 |
| 7,127,038 | B2 * | 10/2006 | Kondradsson et al. | 378/155 |
| 7,629,585 | B2 * | 12/2009 | van Dulmen et al. | 250/363.04 |
| 2004/0251420 | A1 * | 12/2004 | Sun | 250/370.09 |

* cited by examiner

*Primary Examiner*—David P Porta
*Assistant Examiner*—Faye Boosalis

(57) ABSTRACT

A grid suitable for being positioned and held in relation to a detector has positive positioning means and at least one magnet for holding the grid.

23 Claims, 7 Drawing Sheets

MAGNETICALLY RETAINED INTERCHANGEABLE COLLIMATORS FOR SCINTILLATION CAMERAS

PRIORITY CLAIM

This application claims the benefit under 35 USC 119(e) of U.S. Provisional Application No. 60/973,075 filed on Sep. 17, 2007, the entire contents of which is hereby incorporated by reference in its entirety.

TECHNICAL FIELD

The technical field of the present invention relates to a grid, such as a collimator or antiscatter grid, and method for mounting such a grid. More particularly, the hereinafter described grid and method allows a collimator to be changed and positioned accurately in relation to a detector, such as a gamma camera detector.

BACKGROUND

Medical devices, such as, for example nuclear or scintillation or gamma cameras are conventionally used to perform Single Photon Emission Computed Tomography (SPECT) studies. A patient may ingest a radiopharmaceutical, such as Thallium or Technetium, which emits gamma radiation from a body organ which is the subject of a medical study. The gamma camera detects the radiation and generates data indicative of the position and energy of the radiation which is then mathematically corrected, refined and processed through a procedure known as reconstruction tomography (performed by a computer) to produce pictures of scintigrams (two or three dimensional) of the body organ which is the subject of the study.

Different radiopharmaceuticals produce gamma rays having different energies typically expressed as photopeak energy in electron volts corresponding to the output pulse generated by a photomultiplier tube ("PMT") in response to a scintillation produced by a crystal when struck by a gamma ray. A gamma camera may be fitted with two detector heads, each of which is fitted with a collimator and each head extends in a two dimensional plane, referred to herein as the x, y plane. Each head contains an array of photomultipliers which are arranged behind a scintillation crystal. The PMT's generate analog pulse signals in response to the scintillations produced by the crystal when struck with gamma rays passing through the collimator which indicate the energy of the gamma ray, i.e., the photopeak signal. The pulse signals are grouped, digitized, corrected and processed as data indicative of position, x, y, and energy, z. This data correlates to a pixel of a 2 dimensional picture spanning or encompassing the area of the detector head. A two head gamma camera will simultaneously generate two such pictures or scintigrams (a 3 head camera will generate 3 pictures, etc), each of which may be viewed as being similar to an x-ray. The heads will then typically rotate about the body and generate additional pictures which are then assembled together to make a 3 dimensional view of the object precisely pinpointing the shape of any abnormality emitting gamma radiation within the organ.

Gamma cameras are fitted with removable grids, such as for example, collimators having varying thicknesses for collimating gamma rays of various energies. Collimators in gamma cameras absorb angular rays in the septa so that only parallel rays pass through and strike the crystal. For higher energy gamma rays, the thickness or depth of the passages or channels in the collimator has to increase to absorb the cross channel and slightly angular rays which would otherwise pass through the collimator. Gamma cameras are thus typically supplied with thin, medium and thick removable and interchangeable collimators sized to cover the energy spectrum of the gamma radiation used in SPECT studies. These collimators must be repositioned each time they are changed.

Collimators that restrict the direction of gamma rays impinging on scintillation detectors may be used for imaging distributions of single photon emitting radionuclide. These devices are heavy, due to their construction from dense, high-Z materials, and may be retained on moving detector heads, which may be used to generate data for single photon emission computed tomography (SPECT), i.e. three-dimensional tomographic imaging. Different collimators are often used for different imaging tasks, such as for example using different radionuclide that emit different energy gamma rays, or selecting a desired combination of resolution and sensitivity. When exchanged, collimators must be positioned and repositioned in a precise, repeatable fashion in order to maintain, for example, calibration, either for accurate correction and calculation of gamma-ray projections or correction for flood non-uniformity, due to collimator fabrication inaccuracies.

Small animal SPECT imagers may employ collimators with one or more pinholes to enable high resolution imaging by magnification of the object space onto the detector. Heavy tungsten alloy plates or lead alloy plates with tungsten or gold inserts may be mounted to pyramidal lead alloy shields that hold the pinholes at the required focal length distance from the detector face.

In view of the prior art discussed above, there is a need to provide a grid and method allowing for simple, quick, and secure positioning and holding of the grid on the detector. This may maintain calibration. Hereby accurate correction and calculation of gamma-ray projections or correction for flood non-uniformity, due to grid fabrication inaccuracies, may be made.

Tools or fasteners may be judged to be a hazard because screw threads can be damaged by a user, and small items such as screws or tools might be dropped into a scanner. Consequently, easy installation and removal without the use of tools or fasteners is desired.

There is further a need to improve the quality of the images taken. The accurate positioning of an antiscatter grid, such as a collimator, does affect image quality.

There further exists a desire to reduce the time for setting up the medical device carrying the grid. A simple, quick, and secure positioning and holding of the grid on the detector may reduce the time for setting up the medical device.

There also exists a need to minimize the structure of the grid, the detector, and the medical device carrying the grid. It is desirable to have a light detector. Small and light detectors can be easily moved around the subject and in the medical device.

It is desirable to avoid cumbersome arrangements for positioning and holding a grid on a detector, in an economic and technical perspective.

Additionally, it is desirable to provide the necessary retention force while a detector is rotated 360 degrees, as well as precise repositioning when installing, and easy installation and removal without the use of tools or fasteners.

SUMMARY

According to an embodiment, a grid suitable for being positioned and held in relation to a detector may comprise positive positioning means; and at least one magnet for holding the grid.

According to a further embodiment, the positive positioning means may be at least one of a groove, pin, slot, bushing, protrusion, or recess. According to a further embodiment, the grid can be a collimator or antiscatter grid, such as a small, medium, large, and/or heavy lead grid. According to a further embodiment, the grid may further comprise a sensor for detecting proper positioning and holding of the grid. According to a further embodiment, the grid may further comprise a cam mechanism for detaching the grid. According to a further embodiment, the grid may further comprise a handle for handling the grid.

According to another embodiment, a detector suitable for positioning and holding a grid, may comprise at least one magnet suitable for holding the grid; and positive positioning means.

According to a further embodiment, the positive positioning means may be at least one of a groove, pin, slot, bushing, protrusion, or recess. According to a further embodiment, According to a further embodiment, the detector may further comprises a pyramid. According to a further embodiment, the pyramid may further comprises a receiver for holding the grid. According to a further embodiment, the detector may further comprises a sensor for detecting proper positioning and holding of the grid. According to a further embodiment, the detector may further comprise a cam mechanism for detaching the grid.

According to yet another embodiment, a system may comprise a grid suitable for being positioned and held in relation to a detector, wherein the grid and detector each comprises complementary positive positioning means; and the grid and detector each comprises at least one magnet, the magnets being adapted to interact with each other to hold the grid in relation to the detector.

According to a further embodiment, the positive positioning means may be at least one of a groove, pin, slot, bushing, protrusion, or recess. According to a further embodiment, the system may further comprises a pyramid. According to a further embodiment, the pyramid may further comprises a receiver for holding the grid. According to a further embodiment, the system may further comprise a cam mechanism for detaching the grid. According to a further embodiment, the system may further comprise a sensor for detecting proper positioning and holding of the grid. According to a further embodiment, the magnetic force of the magnets may be approximately half or more of the g-force of the grid.

According to yet another embodiment, a method for positioning and holding a grid to a detector may comprise the steps of:—positioning the grid in relation to on the detector by use of positive positioning means; and—holding the grid to the detector by magnetic force.

According to a further embodiment, the method may further comprise the step of detecting proper positioning and holding of the grid by a sensor. According to a further embodiment, the method may further comprise the step of using a cam mechanism for detaching the grid.

Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any preceding claimed embodiment(s).

BRIEF DESCRIPTION OF THE DRAWINGS

The accompanying drawings, which are incorporated in and constitute a part of the specification, illustrate presently preferred embodiments, and together with the general description given above and the detailed description of the preferred embodiments given below, serve to explain, by way of example, the principles of the invention. Similar reference numerals indicate similar items throughout the description.

DETAILED DESCRIPTION

At least one embodiment may provide a grid, a detector, a system and method allowing for simple, quick, and secure positioning and holding of the grid on the detector. Hereby calibration may be maintained when changing the grid. Additionally, accurate correction and calculation of gamma-ray projections or correction for flood non-uniformity, due to grid fabrication inaccuracies, may be made.

At least one embodiment may improve the quality of the images taken. The accurate positioning of an antiscatter grid, such as a collimator, allowed by the at least one embodiment improves image quality.

At least one embodiment may reduce the time for setting up the medical device carrying the grid. A simple, quick, and secure positioning and holding of the grid on the detector allowed by the at least one embodiment may reduce the time for setting up the medical device.

At least one embodiment may minimize the structure of the grid, the detector, and the medical device carrying the grid. It is desirable to have a light detector. Small and light detectors can be easily moved around the subject and in the medical device.

At least one embodiment may avoid cumbersome arrangements for positioning and holding a grid on a detector, in an economic and technical perspective.

At least one embodiment may provide the necessary retention force while a detector is rotated 360 degrees, as well as precise repositioning when installing, and easy installation and removal without the use of tools or fasteners.

Embodiments avoids the use of tools or fasteners judged to be a hazard because screw threads can be damaged by a user, and small items such as screws or tools might be dropped into a scanner. Consequently, at least one embodiment may provide easy installation and removal without the use of tools or fasteners.

At least one embodiment may magnetically retain interchangeable collimators for scintillation cameras. This may allow users to change single and multiple pinhole collimator plates, as well as other types of collimators, by simply sliding them on and off a shielding mount of a detector. The collimators are precisely and repeatably positioned using positive positioning means, such as for example pins and bushings, while necessary mechanical holding forces are achieved by magnets. This may result in embodiments positioning and holding grids, such as for example collimators, without the need for a precise mechanism, cumbersome fasteners, or the use of tools.

Figure 1:
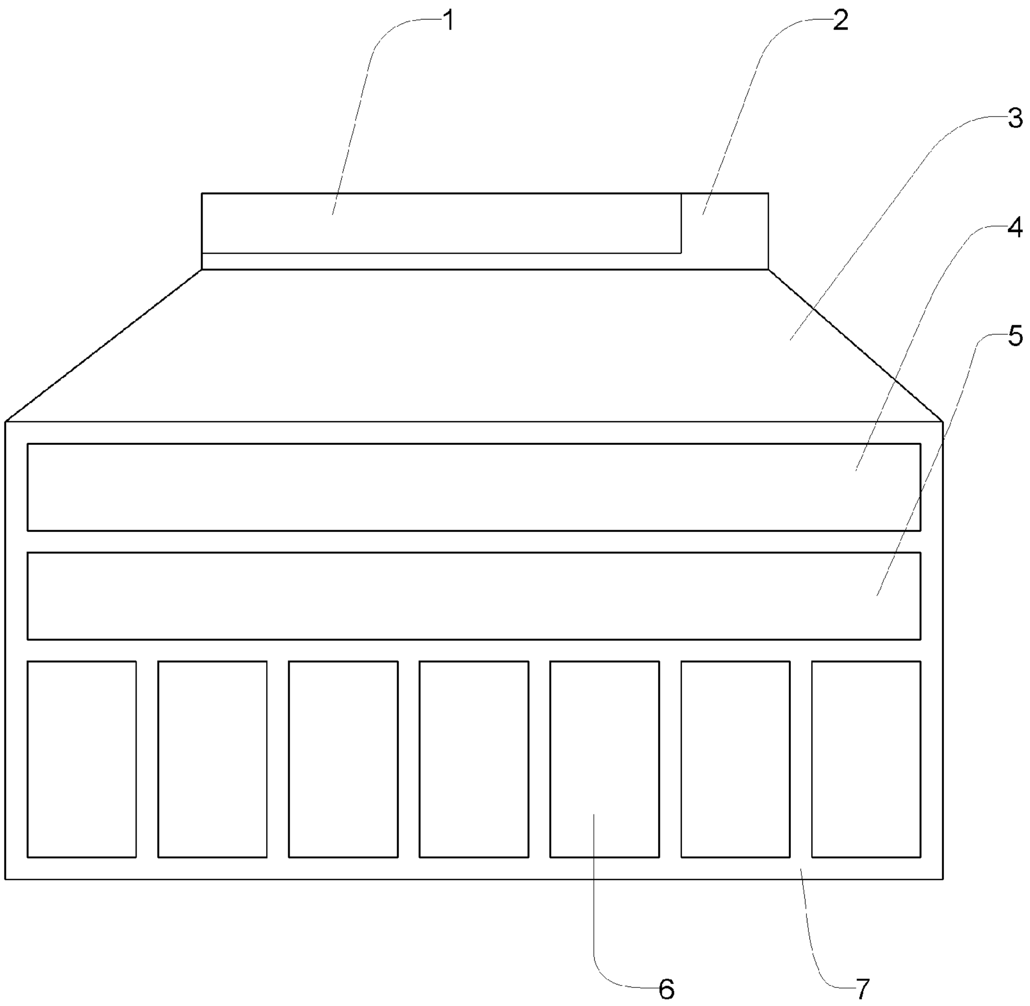
FIG. 1 shows a grid according to one embodiment.

FIG. 1 shows a detector 7 with a grid 1 according to one embodiment. The detector 7 comprises photomultiplier tubes 6, a light guide 5, and a scintillator crystal 4. The detector 7 may have a pyramid 3 mounted on the side facing the incoming radiation. On top of the pyramid the grid 1 may be mounted. The grid 1 may in an alternative embodiment be mounted to the detector 7 without a pyramid in between.

The grid 1 may be a collimator or an antiscatter grid. The grid 1 may be any size, such as for example small, medium or large. A further example of a grid is a clinical parallel hole collimator. The grid 1 may be light or heavy. Furthermore, the grid 1 may comprise any suitable material, such as lead.

The grid 1 is interchangeably mounted onto the pyramid 3 or directly to the detector 7 without the pyramid 3 in between. In other words, the grid 1 is detachably mounted on the pyramid 3 but the grid may instead be directly detachably mounted on the detector 7. In some embodiments the pyramid 3 may be a part of the detector 7. Depending on application, different types of grids 1 are used. The grid 1 may be held and positioned to the pyramid 3 or detector 7 by a receiver 2. However, according to further embodiments, the receiver 2 may not be necessary because the pyramid 3 or the detector 7 may provide the same function as the receiver 2.

Figure 2:
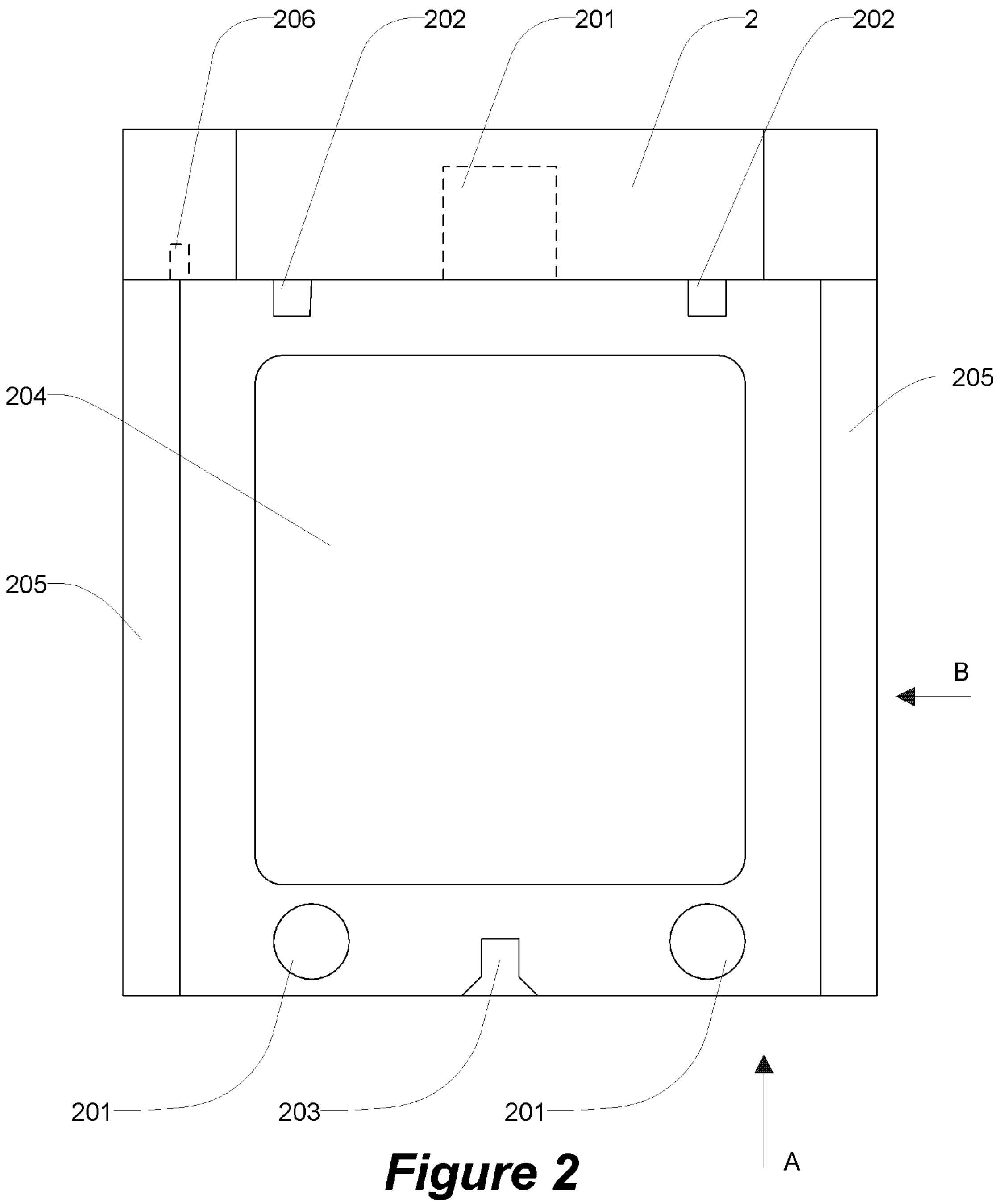
FIG. 2 shows a receiver according to an embodiment.
Figure 3:
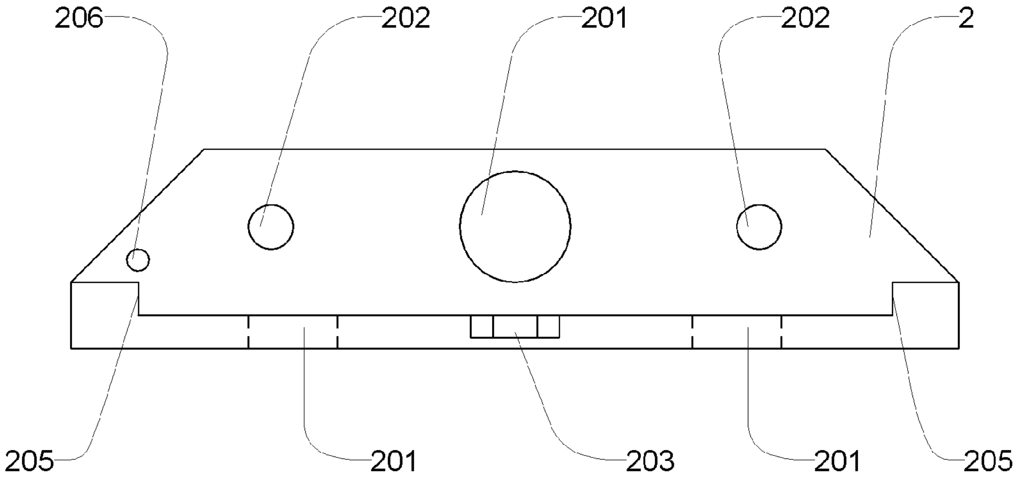
FIG. 3 shows a view according to arrow A in FIG. 2 of the embodiment shown in FIG. 2.
Figure 4:
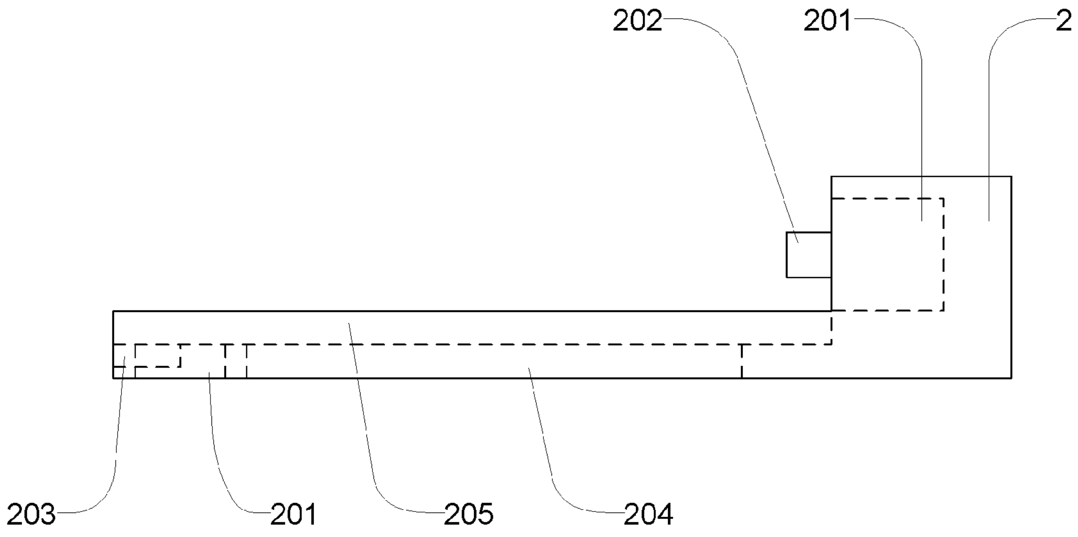
FIG. 4 shows a view according to arrow B in FIG. 2 of the embodiment shown in FIG. 2.
Figure 5:
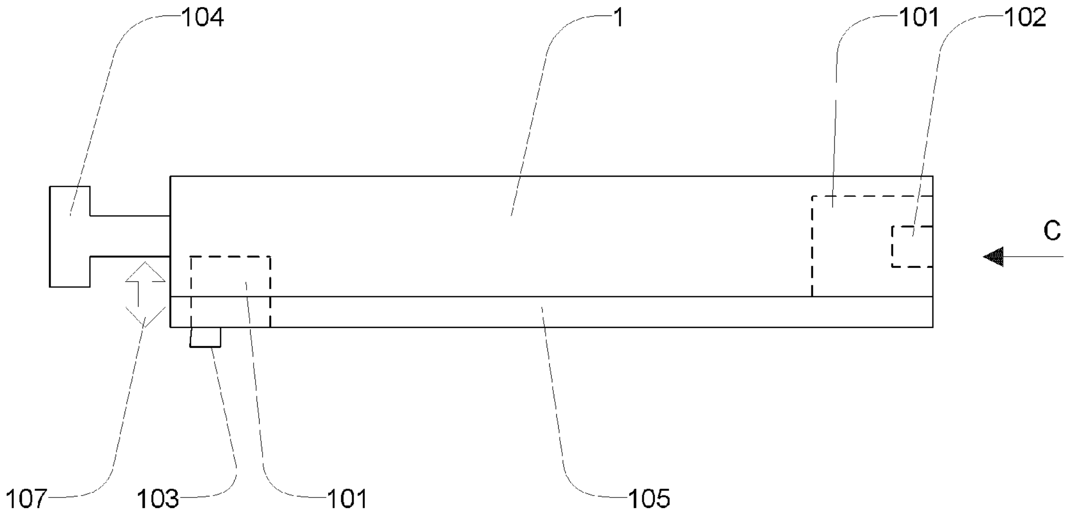
FIG. 5 shows a grid according to an embodiment.
Figure 6:
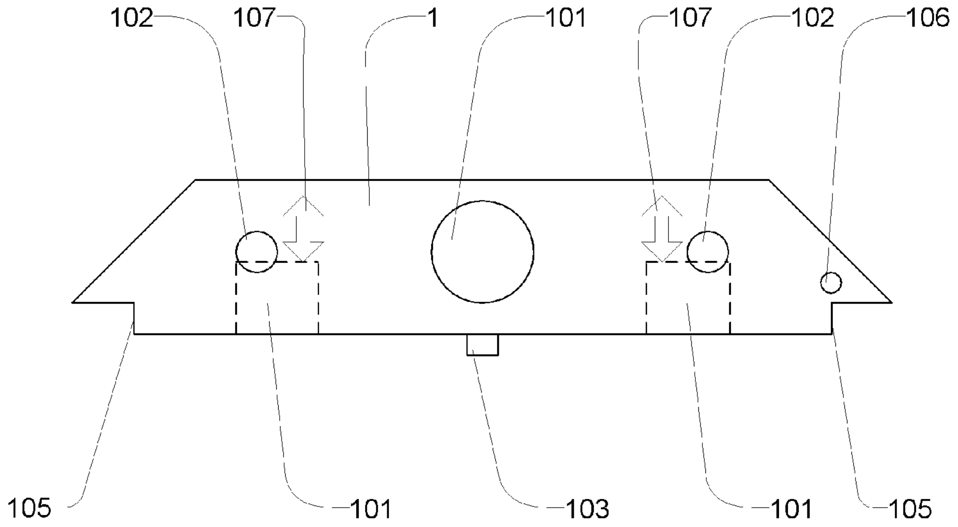
FIG. 6 shows a view according to arrow C in FIG. 5 of the embodiment shown in FIG. 5.

Turning to FIGS. 2 to 6, a receiver 2 according to an embodiment is shown by FIGS. 2 to 4 and a grid 1 according to an embodiment is shown by FIGS. 5 and 6. As explained above, an embodiment comprising a receiver 2 is only one example and the technical function that is achieved by the receiver 2 can be implemented by other parts of the detector 7, such as for example the top surface of detector 7.

FIG. 2 shows an embodiment of a receiver 2. The receiver 2 may comprise one or more magnets 201 that is placed such that it can interact with a magnet or metallic alignment element of a grid to be held and positioned onto the receiver 2. The magnet 201 may be, for example, a neodymium "pot" magnet. The structure of a ferromagnetic cup and internal cylindrical shield of a "pot" magnet assembly may restrict the poles of the magnet and may concentrate its magnetic field toward one end. The depth of the magnet 201 may be adjusted, in relation to the surface in which they are mounted, to just below flush or lower to set the desired magnetical force. The magnetic force may, for example, support approximately half of the weight of a grid when the detector is in an inverted position.

The receiver 2 may further comprise one or more positive positioning means 202 and 203. In FIG. 2 two examples of positive positioning means 202 are shown in the form of protrusions and one positive positioning means 203 in the form of a groove. These positive positioning means 202 and 203 are in such a position that they can interact with positive positioning means of a grid to be held and positioned on to the receiver 2. At least one of the positive positioning means may be in the form of a groove, pin, slot, bushing, protrusion, or recess. The positive positioning means may be any combination hereof. Any other kind of positive positioning means may be used instead or in combination. Even if the embodiment in FIG. 2 shows two positive positioning means 202 and one positive positioning means 203, there may be more or less positive positioning means or any combination hereof. By using positive positioning means 202 to co-operate with the magnets 202, the force of the magnets need not to be able to carry the whole weight of a grid placed on the receiver 2.

The receiver 2 may further comprise one or more positive positioning means in the form of a guide 205. In FIG. 2 there are two guides 205 shown. The guides 205 may interact with complementary positive positioning means, such as for example guides, of a grid to be held and positioned onto the receiver 2.

The receiver 2 may further comprise an opening 204 for allowing the radiation to pass through to the photomultiplier tubes 7.

The embodiment may further comprise a sensor 206 for detecting proper positioning and holding of the grid. The sensor 206 may be provided to detect completion of the "magnetic circuit". Alternatively, or in addition, the sensor 206 may detect proper positioning of a grid. The sensor 206 may in addition indicate the type of grid held and positioned. The sensor 206 may thus function as a safety feature.

Turning to FIG. 3, a view according to arrow A in FIG. 2 of the embodiment shown in FIG. 2 is shown. Here the exemplary locations of the magnets 201 and the exemplary positive positioning means 202 and 203 are shown. The exemplary guides 205 are also indicated. The exemplary sensor 206 is also indicated.

Turning to FIG. 4, a view according to arrow B in FIG. 2 of the embodiment shown in FIG. 2 is shown. Here the exemplary locations of the magnets 201 and the exemplary positive positioning means 202 and 203 are shown. The exemplary guides 205 are indicated, as well as the exemplary opening 204.

FIG. 5 shows and embodiment of a grid 1. The embodiment of this grid 1 may be held and positioned to the embodiment of the receiver 2 shown in FIGS. 2 to 4. This grid 1 may comprise at least one magnet or metallic alignment element 101 that is placed such that it can interact with a magnet of a receiver or detector. The magnet 101 may be a neodymium "pot" magnet. The structure of a ferromagnetic cup and internal cylindrical shield of a "pot" magnet assembly may restrict the poles of the magnet and may concentrate its magnetic field toward one end. The depth of the magnets 101 may be adjusted, in relation to the surface in which they are mounted, to just below flush or lower to set the desired force. The force may, for example, support approximately half of the weight of the grid 1 when the detector is in an inverted position.

The grid 1 may further comprise one or more positive positioning means 102 and 103. In the FIG. 5 two examples of positive positioning means 102 are shown in the form of recesses and one positive positioning means 103 in the form of a pin. These positive positioning means 102 and 103 are in such a position that they can interact with positive positioning means of a receiver or detector arranged for holding and positioning the grid 1. At least one of the positive positioning means may be in the form of a groove, pin, slot, bushing, protrusion, or recess. The positive positioning means may be any combination hereof. Any other kind of positive positioning means may be used instead or in combination. Even if the embodiment in FIG. 2 shows two positive positioning means 102 and one positive positioning means 103, there may be more or less positive positioning means or any combination hereof.

The grid 1 may further comprise one or more positive positioning means in the form of a guide 105. In FIG. 5 one guide 205 is shown. The guide 205 may interact with complimentary positive positioning means, such as for example guides, of a receiver or detector for holding and positioning the grid 1.

The openings in the grid 1 for allowing radiation to pass through to the photomultiplier tubes are not shown in the Figures.

Furthermore, FIG. 5 shows a handle 104 that can be gripped by a person handling the grid 1. Such a handle 104 on, for example, the front edge of the grid 1 may allow the user to overcome frictional forces caused by the weight of the grid 1 and the magnetic hold down force when removing it.

In embodiments with larger magnetic forces and/or frictional forces between the grid 1 and the receiver 2 or detector 7, the grid 1 may be moved away from the receiver 2 or detector 7 with the help of a simple cam mechanism. This cam mechanism has been indicated by arrow 107 in FIG. 5. Operation of the cam mechanism may move the grid 1 away from the receiver 2 or detector 7 to facilitate the removal of the grid 1. Since the magnetic force and/or frictional force will be decreased by the movement of the grid 1 away from the receiver 2 or detector 7, the pulling force of the handle 104 may be increase. The use of a cam mechanism may be particularly useful for larger collimators on a clinical imaging system since pot magnet assemblies exerting great magnetic force may be used.

In a further embodiment, instead of moving the grid 1 away from the receiver 2 or detector 7, the cam mechanism could retract the magnets in the grid 1. A schematic indication of such a cam mechanism for retracting the magnets 101 is given by way of example in FIG. 6 by arrow 107. Since the magnetic force and/or frictional force will be decreased by the movement of the magnets 101 away from the receiver 2 or detector 7, the pulling force of the handle 104 may be increase. Hereby large and heavy grids may be used in embodiments.

Turning to FIG. 6, a view according to arrow C in FIG. 5 of the embodiment shown in FIG. 5 is shown. Here the exemplary locations of the magnet 101 and the exemplary positive positioning means 102 and 103 are shown. The exemplary two guides 105 are also indicated.

An embodiment may comprise an exemplary sensor 106 for detecting proper positioning and holding of the grid. The sensor 106 may be provided to detect completion of the "magnetic circuit". Alternatively, or in addition, the sensor 106 may detect proper positioning of a grid. The sensor 106 may in addition indicate the type of grid held and positioned. The sensor 106 may thus function as a safety feature. The sensor 106 may interact with the sensor 206. However, this is not necessary and depends on the type of sensor selected. Embodiments herein described may improve and/or reduce the cost in clinical or industrial imaging scintillation detector designs.

A more specific example of an embodiment shown by the schematic FIG. 1 to 6 may be a part of a medical device for taking images by using pinhole collimator plates. The various plates may be installed onto a lead collimator pyramid. The collimator plates may slide in a channel in a receiver at the top of the pyramid, and bushings in the back end of the plate may mate with dowel pins in the receiver stop block to achieve precise, repeatable positioning. A small dowel pin may project from the bottom of each plate, allowing for additional location precision by engaging, for example, a slot milled in the front of the receiver.

The more specific example of an embodiment may further provide magnetic retention accomplished by using, for example, two neodymium "pot" magnets in the lead collimator pyramid. The structure of the ferromagnetic cup and internal cylindrical shield of a "pot" magnet assembly may restrict the poles of the magnet and may concentrate its magnetic field toward one end. These magnet assemblies may attract ferromagnetic low carbon steel disks pressed into the non-ferromagnetic collimator material, such as for example tungsten heavy alloy comprising 95% W, 3.5% Ni and 1.5% Cu. The depth of the magnets may be adjusted to just below flush or lower to set the desired force. This force may support approximately half of the weight of the collimator plates when the detector is in an inverted position. A magnet/disk combination at the back end of the plate exerts a smaller force to hold the plate against the stop block. The possible detector orientations during SPECT acquisition may not require the force of the magnets to support the weight of the collimator plate.

Figure 7:
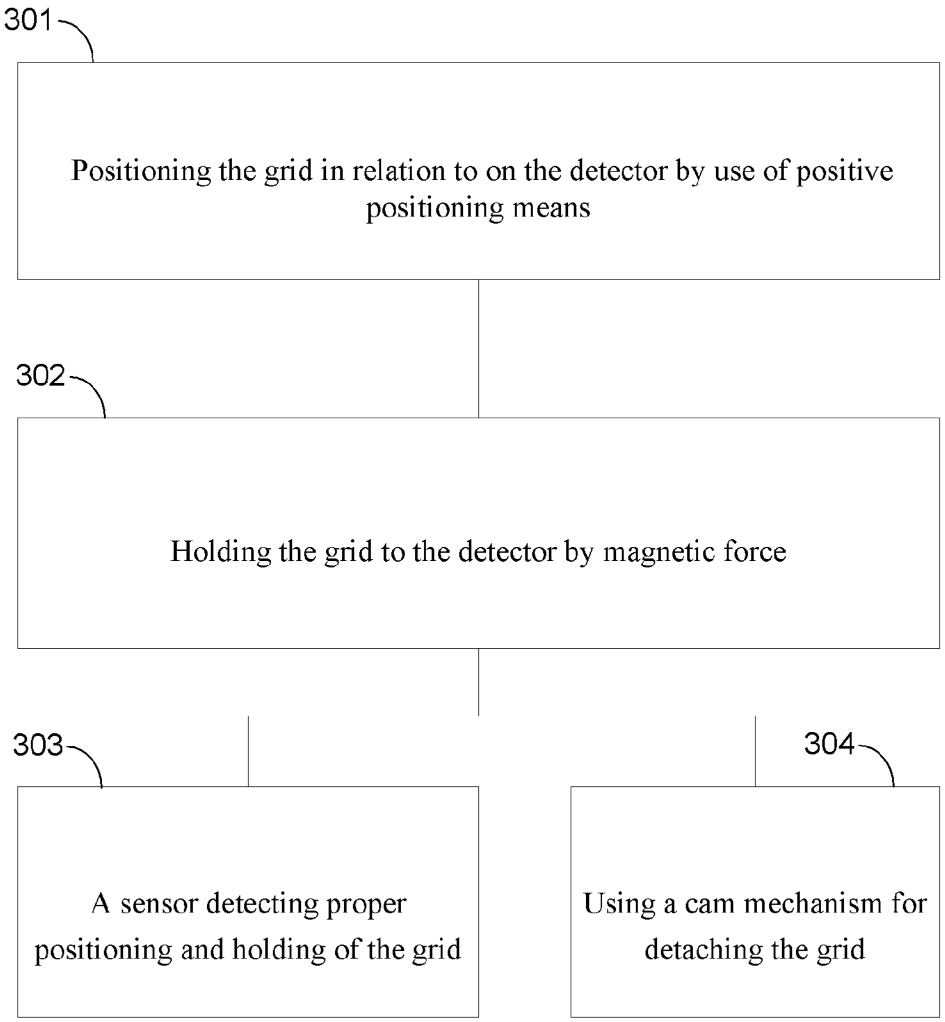
FIG. 7 shows a flow chart of a method for positioning and holding a grid to a detector according to an embodiment.

Turning to an embodiment of the method described in FIG. 7, a flow chart of a method for positioning and holding a grid to a detector according to an embodiment is shown. The embodiment of the method for positioning and holding a grid to a detector may comprise the following steps in any order. A first step 301 may be that of positioning the grid 1 in relation to on the detector 7 by use of, for example, positive positioning means 102, 202, 103, 203, 105, and 205 as described above. A second step 302 may be that of holding the grid 1 to the detector 7 by magnetic force.

In a further embodiment of the method may include the step 303. The step 303 may be that of a sensor 106 and/or 206 detecting proper positioning and holding of the grid 1.

In yet a further embodiment of the method may include the step 304. The step 304 may be that of using a cam mechanism for detaching the grid 1.

At least one of the embodiments herein described provides the technical advantage of avoiding the use of screw-type fasteners. Screw-type fasteners can cause damage to threads by "cross-threading". Further, screw-type fasteners require tools for installation. These tools are not needed in at least one of the embodiments herein described. Since for example a SPECT detector may be inside a shielded gantry that is inaccessible to users, it is not desirable to require the user to use tools or fasteners which might be dropped into the gantry. Even captive fasteners can be incorrectly engaged and have their threads damaged. Either event could require a service call or repair or replacement of components. At least one of the embodiments herein described avoids these disadvantages.

At least one of the embodiments herein described avoids compromising shielding effectiveness at edges of grids that might result from employing mechanical hold-down components while allowing nesting (along a 45 degree bevel) of adjacent detectors in a four detector system.

At least one of the embodiments herein described may provide the following characteristics of a grid:

1. The grid may be slided on and off, and is retained magnetically.
2. No tools or fasteners are needed.
3. Precise positioning is achieved by using positive positioning means, such as for example pins and bushings at one end and a pin and slot in the other.

The grid and method discussed above allows for simple, quick, and secure positioning and holding of the grid on the detector. The invention, therefore, is well adapted to carry out the objects and attain the ends and advantages mentioned, as well as others inherent therein. While the invention has been described and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A grid suitable for being positioned and held in relation to a detector having a detector engagement surface for slidable receipt of a grid and a first positive positioning element coupled to the detector engagement surface, the grid comprising:

a grid engagement surface adapted for selective slidable insertion within the detector engagement surface;

a second positive positioning element coupled to the grid engagement surface, configured to mate slidably with the first positive positioning element, and thereby position and retain the grid with respect to the detector upon selective insertion therein; and at least one magnet coupled to the grid engagement surface, configured to hold the grid with respect to the detector by inhibiting inadvertent separation of the first and second positive positioning elements.

2. The grid according to claim 1, wherein the positive positioning element is selected from the group consisting of:

a groove, a pin, a slot, a bushing, a protrusion, and a recess.

3. The grid according to claim 1, wherein the grid is a collimator or an antiscatter grid.

4. The grid according to claim 1, wherein the grid is selected from the group consisting of:

a small lead grid, medium lead grid, a large lead grid, and a heavy lead grid.

5. The grid according to claim 1, wherein the grid further comprises a sensor configured to detect proper positioning and holding of the grid,

6. The grid according to claim 1, wherein the grid further comprises a cam mechanism for detaching the grid.

7. The grid according to claim 1, wherein the grid further comprises a handle.

8. A detector suitable for positioning and holding a grid having a grid engagement surface for slidable insertion into the detector and a second positive positioning element coupled to the grid engagement surface, the detector comprising:

a detector engagement surface for slidable receipt of the grid engagement surface;

at least one magnet coupled to the detector engagement surface and configured to hold the grid with respect to the detector when the grid is slidably inserted therein, so as to prevent inadvertent separation thereof; and a first positive positioning element coupled to the detector engagement surface, configured to mate slidably with the second positive positioning element and position and retain the detector with respect to the grid upon selective insertion therein.

9. The detector according to claim 8, wherein the positive positioning element is selected from the group consisting of:

a groove, a pin, a slot, a bushing, a protrusion, and a recess.

10. The detector according to claim 8, wherein the detector further comprises a pyramid.

11. The detector according to claim 10, wherein the pyramid further comprises a receiver configured to hold the grid with respect to the detector.

12. The detector according to claim 8, wherein the detector further comprises a sensor configured to detect proper positioning and holding of the grid.

13. The detector according to claim 8, wherein the detector further comprises a cam mechanism for detaching the grid.

14. A system comprising:

a detector having a detector engagement surface and a first positive positioning element coupled to the detector engagement surface;

a grid having a grid engagement surface and a second positive positioning element coupled to the grid engagement surface configured to mate slidably with the first positive positioning element and position the grid with respect to the detector when the respective engagement surfaces are engaged; and first and second magnets coupled to the respective engagement surfaces, the magnets being configured to interact with each other to hold the grid in relation to the detector by inhibiting inadvertent separation of the respective positive positioning elements.

15. The system according to claim 14, wherein the positive positioning element is selected from the group consisting of:

a groove, a pin, a slot, a bushing, a protrusion, and a recess.

16. The system according to claim 14, further comprising a pyramid.

17. The system according to claim 16, wherein the pyramid further comprises a receiver configured to hold the grid with respect to the detector.

18. The system according to claim 14, wherein the system further comprises a cam mechanism for detaching the grid.

19. The system according to claim 14, wherein the system further comprises a sensor for detecting proper positioning and holding of the grid.

20. The system according to claim 14, wherein the magnetic force of the magnets are approximately half or more of the g-force of the grid.

21. A method for positioning and holding a grid to a detector, the method comprising:

providing a detector having a detector engagement surface and a first positive positioning element coupled to the detector engagement surface;

providing a grid having a grid engagement surface and a second positive positioning element coupled to the grid engagement surface, the second positive positioning element configured to mate slidably with the first positive positioning element when their respective engagement surfaces are slidably engaged;

providing a magnet coupled to at least one of the respective engagement surfaces;

slidably engaging and positioning the grid in relation to on the detector by use of the respective positive positioning elements; and holding the grid to the detector in their respective engaged positions by magnetic force generated by the magnet, so as to prevent inadvertent separation of the respective positive positioning elements.

22. The method according to claim 21, further comprising detecting proper positioning and holding of the grid by a sensor.

23. The method according to claim 21, further comprising using a cam mechanism for detaching the grid.

* * * * *